United States Patent
Dedek

(10) Patent No.: US 7,529,258 B2
(45) Date of Patent: May 5, 2009

(54) METHOD AND SYSTEM FOR CASCADING ANALYZER TRACE MEMORIES

(75) Inventor: Jan Dedek, Palo Alto, CA (US)

(73) Assignee: LeCroy Corporation, Chestnut Ridge, NY (US)

( * ) Notice: Subject to any disclaimer, the term of this patent is extended or adjusted under 35 U.S.C. 154(b) by 789 days.

(21) Appl. No.: 10/637,796

(22) Filed: Aug. 8, 2003

(65) Prior Publication Data

US 2004/0170168 A1 Sep. 2, 2004

Related U.S. Application Data

(60) Provisional application No. 60/402,137, filed on Aug. 9, 2002.

(51) Int. Cl.
*G06F 12/02* (2006.01)
(52) U.S. Cl. .......................... 370/412; 711/1
(58) Field of Classification Search ................. 370/412, 370/389, 428, 429; 711/1
See application file for complete search history.

(56) References Cited

U.S. PATENT DOCUMENTS 5,347,649 A * 9/1994 Alderson ................. 719/312
6,009,270 A * 12/1999 Mann ........................ 717/128
6,430,675 B1 * 8/2002 Hsu et al. .................... 712/205
6,687,811 B1 * 2/2004 Yamada ...................... 712/227

* cited by examiner

*Primary Examiner*—Brian D Nguyen
(74) *Attorney, Agent, or Firm*—Law Office of Karen Duna Oster, LLC; Gordon Kessler

(57) ABSTRACT

Cascaded analyzer trace memories are described herein. According to one embodiment, the method comprises receiving a packet stream in a master analyzer and a slave analyzer, wherein the master analyzer includes a first trace memory, and wherein the slave includes a second trace memory. According to one embodiment, the method further comprises determining whether the first trace memory has been filled past a memory address. According to one embodiment, if the first trace memory has not been filled past the memory address, storing one or more packets of the packet stream in the first trace memory. In one embodiment, if the first trace memory has been filled past the memory address, performing the following operations: marking a location in the first trace memory, transmitting a signal to the slave analyzer, and storing one or more packets of the packet stream in the second trace memory.

18 Claims, 5 Drawing Sheets

US 7,529,258 B2

METHOD AND SYSTEM FOR CASCADING ANALYZER TRACE MEMORIES

CROSS REFERENCE TO RELATED APPLICATIONS

This application claims priority to U.S. Provisional Patent application No. 60/402137, entitled "CASCADED ANALYZER TRACE MEMORIES," filed on Aug. 9, 2002, which is hereby incorporated by reference.

BACKGROUND

Communications systems are becoming increasingly complex, higher performance, and widespread in application. Designing and debugging communications systems is also becoming increasingly complex. For example, situations exist where it is useful to monitor traffic on a communications system over very long periods of time to find or fix problems.

"Analyzers" are machines typically used to monitor traffic on a communications system. Analyzers typically record "traces" of information and record it in a "trace memory." Typically, one analyzer is used that includes a finite amount of trace memory.

With today's communications systems running at Gigabit/sec speeds, the trace memory in a typical analyzer can fill up very quickly, thereby limiting the amount of time that traffic on a communications system can be monitored.

SUMMARY OF THE INVENTION

The present invention is directed to a method, apparatus, and system for cascading analyzer trace memories.

According to one embodiment, the method includes receiving a packet stream in a master analyzer and a slave analyzer. The master analyzer includes a first trace memory. The slave analyzer includes a second trace memory. According to one embodiment, the method further includes determining whether the first trace memory has been filled past a memory address. According to one embodiment, if the first trace memory has not been filled past the memory address, storing one or more packets of the packet stream in the first trace memory. According to one embodiment, if the first trace memory has been filled past the memory address, performing the following operations: marking a location in the first trace memory, transmitting a signal to the slave analyzer, and storing one or more packets of the packet stream in the second trace memory.

One embodiment of the invention is an apparatus including a master analyzer and a slave analyzer. The master analyzer includes a communication link configured to monitor a packet stream. The master analyzer also includes a trace memory communicatively coupled to the communication link, wherein the trace memory stores packets of the packet stream until the trace memory has been filled past a memory address. After the trace memory has been filled past a memory address, the master analyzer transmits a signal to a salve analyzer to trigger the salve analyzer to store packets of the packet stream in a trace memory of the slave analyzer.

One embodiment of the present invention is a host computer that receives network communications. In one embodiment a plurality of analyzers are communicatively coupled to the host computer. Each of the plurality of analyzers includes a plurality of trace memories that form a single virtual memory space. Ones of the plurality of analyzers store certain portions of the network communications in the trace memories. A disk array is communicatively coupled to one of the plurality of analyzers to store selected contents of the trace memories.

DESCRIPTION OF EMBODIMENTS

Figure 1:
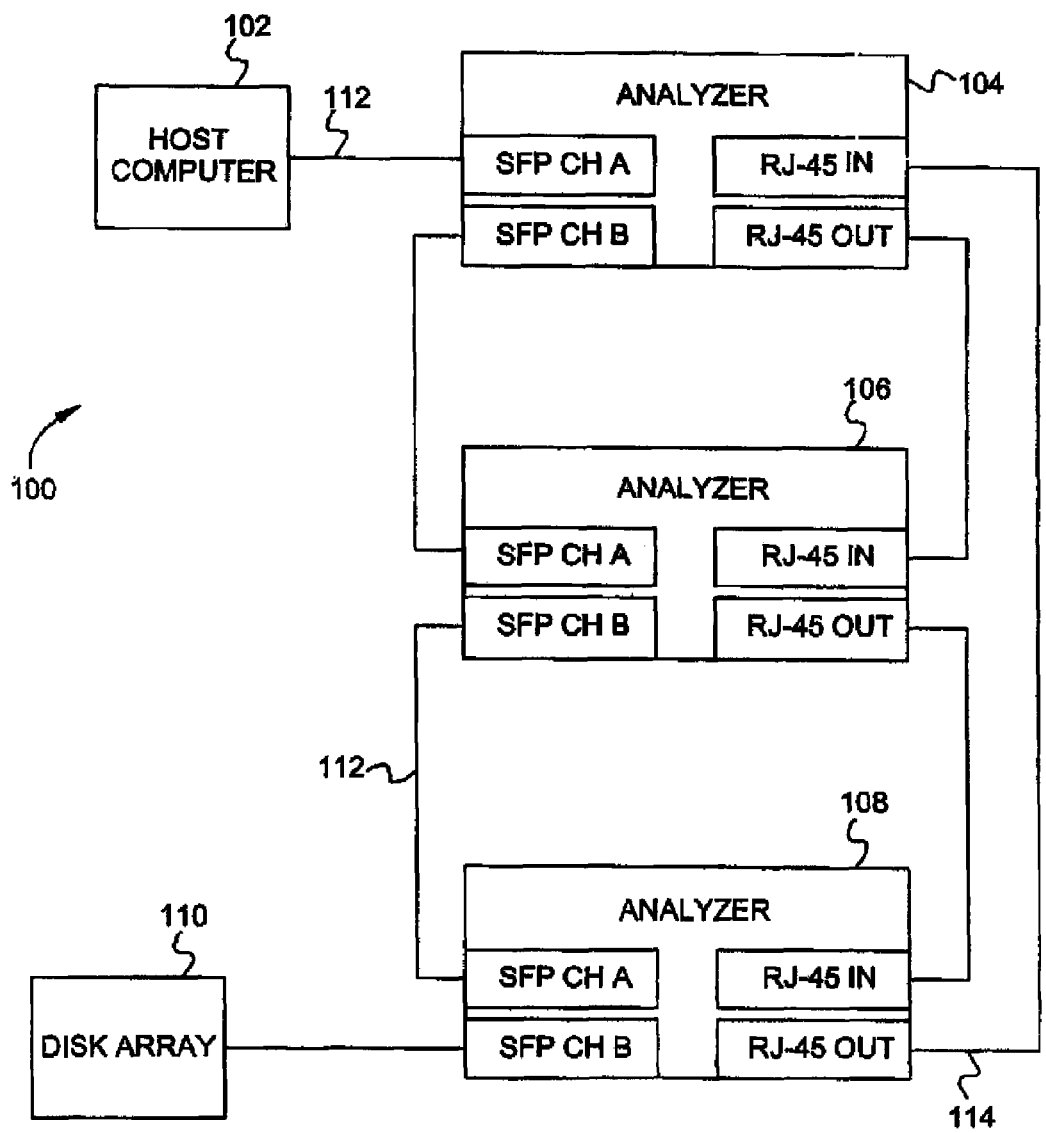
FIG. 1 shows a diagram illustrating a communications system with several daisy-chained analyzers.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram illustrating a communications system with several daisy-chained analyzers. System 100 includes host computer 102, analyzers 104, 106, and 108, and disk array 110. Host computer 102 represents a communication system, which communicates with a target device (e.g. in FIG. 1, the target device is the disk array 110) that is monitored by analyzers 104, 106, and 108. Although the embodiment depicted in FIG. 1 includes the disk array 110 as a target device, other embodiments of the invention call for other target devices (e.g., target devices can be host computers, disk arrays, or any other suitable hardware device). In some embodiments of the present invention, the host computer 102 uses a Fibre channel interface, a SCSI interface, or other suitable type of communications interface.

Host computer 102 is coupled to analyzers 104, 106, and 108 using cables 112. Cables 112 can be fiber optic cables, copper cables, category 5 (CAT-5) cables, or any other suitable type of cable. Analyzers 104, 106, and 108 are coupled by cables 114. Cables 114 can also be any type of cable. In some embodiments, cables 114 are CAT-5 cables. As is explained more fully below, analyzers 104, 106, and 108 monitor traffic on cables 112, and communicate with each other using cables 114. In one embodiment, the analyzer(s) monitor(s) a single communications link between multiple initiators (e.g., in FIG. 1, the host computer 102 is an initiator) and multiple target devices.

As used herein, the term "analyzer" refers to any device capable of monitoring a communications link, and the terms "frame" and "packet" refer to a unit of transfer. In one embodiment, a packet stream is received over the communications link. The packet stream includes a set of one or more packets.

In an exemplary application of system 100, it may be useful to find out which devices on a communications network are being addressed, or where and when errors occur, without regard to the actual payload data. In some embodiments of the present invention, communications traffic of interest can be recorded for prolonged periods of time by using a protocol analyzer (recorder) with very large trace memory and using extensive, selective recording. For example, a filter in the analyzer can be employed to record only frames addressed to a certain destination device address, or to record only frames with CRC or encoding errors, and to filter out other data.

As shown in FIG. 1, multiple analyzers are cascaded. These analyzers are cascaded in such a way that the trace memories in one or more analyzers are concatenated in a virtual fashion across physical boundaries. For example, if three analyzers with 2 Gigabytes of trace memory each are connected together, they appear as one analyzer with 6 Gigabytes of trace memory. Several analyzers are cabled together as a group, one analyzer after another thus creating a chain. The communications link under test is daisy-chained through all analyzers in the group so that all analyzers see the same data. The first analyzer in the group starts recording and all other analyzers in the group sit idle. When the trace memory in the first analyzer fills up, recording continues in the next analyzer in the chain and so on. Recording continues until all analyzers in the group fill up their trace memories and at which time the recording stops. If the group of analyzers use their internal disks to offload the trace from the trace memory and if the analyzers are wired in a circular fashion and if saving of trace to a local disk is fast enough and enabled, and if also extensive traffic filtering is used, it is possible to continue recording until all local disks (saved traces) fill up and all trace memories fill up. With large disk capacities, this could allow almost unlimited recording period.

The analyzers in the group may use a common clock or they can run on independent local clocks. If a common master clock is used, time stamping counters in all analyzers can be synchronized and appear as one. If the analyzers in the group use separate local clocks in each analyzer, software can be used to concatenate the timing information together; each successive analyzer time stamp counter starts from time=zero and the software can offset it by the time at the end of the recording in the preceding analyzer(s). In either case, when presented to the user in the displayed data, the timing information (the end result) is the same.

Figure 2:
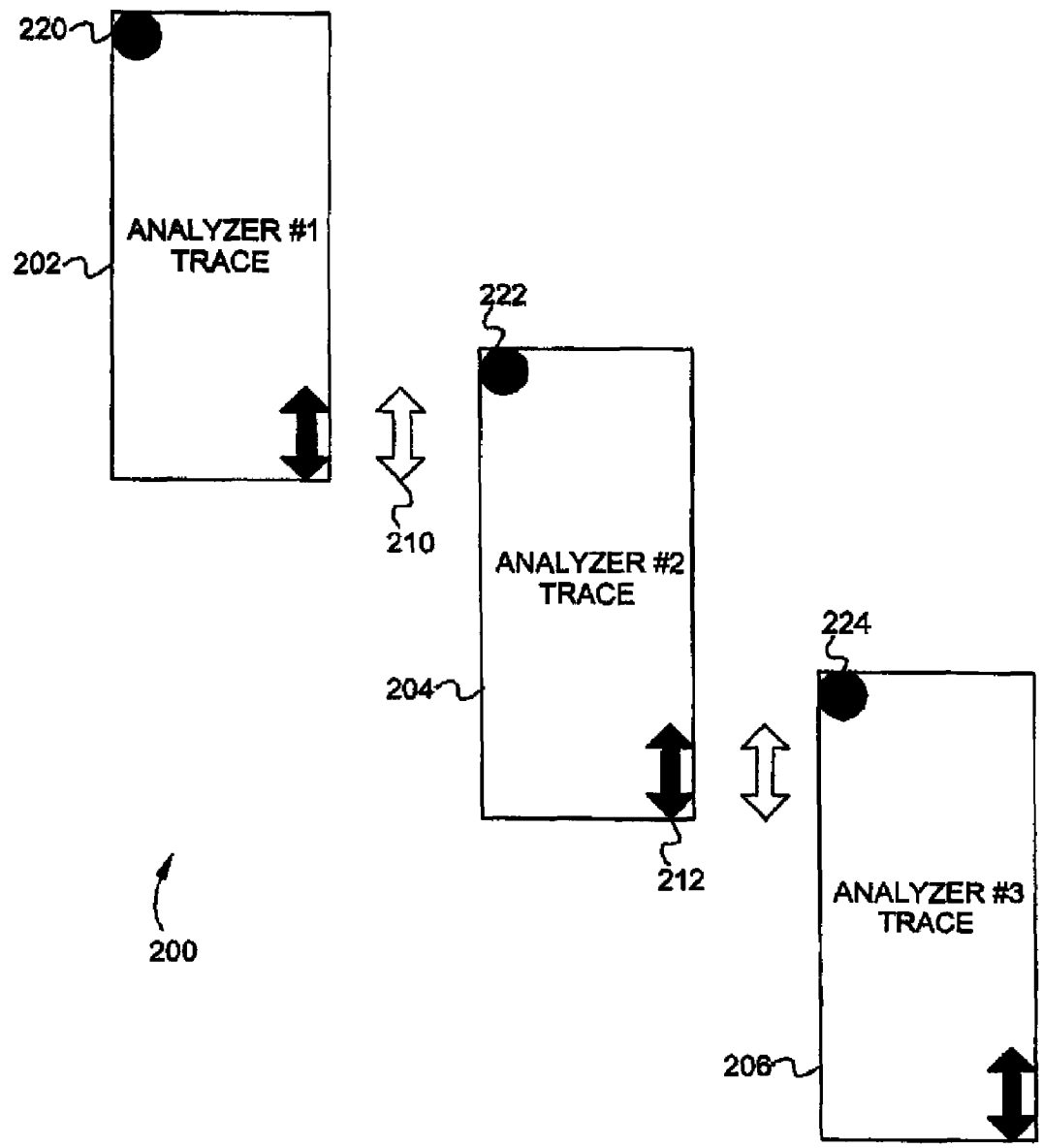
FIG. 2 shows a diagram illustrating cascaded trace memories of the analyzers of FIG. 1.

FIG. 2 shows a diagram illustrating cascaded trace memories of the analyzers of FIG. 1. Trace memories 202, 204, and 206 correspond to trace memory within analyzers 104, 106, and 108, respectively. The combination of separate trace memories 202, 204, and 206 form one larger virtual trace memory represented by 200. Trace memories 202, 204, and 206 show trigger points 220, 222, and 224, respectively. Further, arrow 210 shows transmission word trace overlap between trace memories 202 and 204, and arrow 212 shows a point at which a transmission word "SEAM FLAG" is set to "1." Overlap between trace memories and flags are described in more detail below.

Splicing the segments of trace data from one analyzer to the next can be done in many different ways. In one embodiment, splicing of segments is done in the following way: If one analyzer trace memory is filled to the very last address prior to continuing in the next analyzer, a word or two may be lost during switching in the recording during the actual transfer of control. To avoid this problem, in some embodiments of the present invention, the hardware is designed such that the currently recording analyzer starts watching for the end of the trace memory several frame-lengths before the end (e.g. 4K, or 16K Bytes) of the trace memory. When the trace memory address reaches this point, a SEAM marker is written to that trace memory location and ARM signal is sent to the next analyzer in the chain that triggers start of recording in it. The slave analyzers should have the "position of trigger" set to the beginning of the trace memory so that the recording starts from address zero and the full size of the trace memory is utilized. From now on, and until the end of the trace memory in the preceding analyzer is reached, the recording proceeds in parallel in both analyzers. This way, if recording of a frame was in process when the next analyzer was started, and recording in the next analyzer started in the middle of that frame, the beginning of this frame including the rest of that frame is also recorded in the preceding analyzer. Other embodiments of splicing trace segments exist, and are intended to be within the scope of the invention.

Timing Information/Time Stamping

As mentioned above, the analyzers in the cascading group can use either a common clock source, or can use their own, local independent clocks. If the common clock is used, all time stamps in all analyzers appear as one. If independent clocks are used, the software offsets each succeeding analyzer start time by the ending time of the preceding analyzer before displaying it on the screen It is possible to do the recording without time-stamping that data, if timing information is not needed. The time-stamping is not required for the cascading.

In some embodiments of the present invention, a software utility discovers how the analyzers in a group are wired together. This function is not necessary for the description of the cascading concept; however, it is included here for clarity and completeness of the explanation only. This discovery utility finds out which analyzer is connected to which analyzer, and which one is the very first one in the group. This first analyzer is designated as the Master and all other analyzers are designated as the Slaves. The Master analyzer uses its trigger circuitry to start the recording and transfers the recording to the first Slave as soon as it (almost) fills up its trace memory. All Slaves should have their filters set the same, and should have the trigger circuit to initiate recording from the very beginning of the trace memory (set "trigger position" to the beginning of trace memory). The transfer of recording from analyzer to analyzer is done by an ARM signal from a preceding analyzer to the next analyzer in the group. The ARM signal activates the trigger of the next analyzer, which causes the next analyzer to begin recording.

Description of an Embodiment of the Cascading Operation

The master analyzer starts recording when it gets its RUN command (from the SW, controlled by the user). It keeps recording and may be Wrapping (and writing over its previously recorded trace) until it receives a trigger. Then, according to settings of its "trigger position", it continues recording until it gets close to the Wrap position (i.e., the end of the trace memory). Then, before the end, it generates an ARM to the next analyzer of the group and marks its own trace with a SEAM flag. It keeps recording to the Wrap, then it stops (this is all HW function). The Master ignores its ARM-In port during the first cycle. The Master now holds the first segment of the recorded trace.

Every subsequent analyzer starts recording immediately when it receives ARM (from its preceding analyzer via the ChannelSync cable). "ChannelSync" is a trademarked name of a design by Ancot Corporation of Menlo Park, Calif., U.S.A.) It ignores its own trigger settings and keeps recording till the almost end of its trace memory, then it generates ARM to the next analyzer and marks its trace with the SEAM flag, the same way as the Master. It keeps recording till it gets to Wrap.

All analyzers are wired using the internal or external ChannelSync cables. They all use the same master time-stamp clock. They start recording when they receive the ARM from the preceding analyzer via their own ARM-In port.

When the last analyzer in the chain sends the ARM to the Master analyzer and stops recording, (the Master ignores this signal) all recording in a group is stopped.

At this point the Master holds the first segment of the trace, the next analyzer holds the second segment, etc, all the way to the last analyzer which holds the last segment.

Stitching of the traces segments is done after all analyzers in the group stop. The stitching, done in software, can use either the SEAM flag markings connecting to the beginning of trace in the next analyzer, or align the time-stamps in all analyzers.

In either case, there will be cases when the SEAM occurred while a frame was being recorded. In such a case, the next analyzer start recording past the SOF and will recognize that frame as a "Bad Frame". However, the preceding analyzer will hold the entire frame, assuming that the SEAM is far enough before the Wrap. In some embodiments, this is achieved by having the SEAM before the Wrap at least one max. frame length. In some embodiments, distance between the SEAM and Wrap is—user-programmable, and in other embodiments, it is hard-coded in hardware. The SEAM position can also be an exact distance from the end of the trace memory, rather than a mark stored in a memory location (e.g., a flag).

According to embodiments of the invention, the tracing can be stopped when the trace memory of the last analyzer is filled to its capacity. However, the tracing can wrap back to the first analyzer and continue recording through many such cycles until a user stops the recording through a software program. In one embodiment, when this continuous "wrap" mode is enabled, the originally selected master analyzer will automatically be reprogrammed to respond as a slave, so it can accept an ARM signal from the last slave.

In some embodiments, trace data is saved on a disk which could be either internal or external. Using filtering and/or during lighter traffic periods, there may be time enough to save a trace from analyzer that just filled up its trace memory and stopped. Since the speed of saving trace on disk is given, this function depends heavily on the rate the trace memories are filling up.

Analyzer Hardware Setup

All analyzers to be used with Cascading Trace Memory feature are daisy-chained through ChannelSync interface as shown in FIG. 1.

All analyzers to be used with Cascading Trace Memory feature have to have the Fibre channel full duplex interfaces connected the way that channel A of all analyzers see the same traffic (coming in one direction) and channel B of all analyzers also see the same traffic (coming in the opposite direction).

The order of analyzers (how they are wired physically) determines the concatenation order of the traces. The first analyzer in the chain will hold the first segment of the GiantTrace. The last analyzer in the chain will hold the last segment of the GiantTrace. In the example shown in FIG. 1, analyzer 104 is the first and analyzer 108 is the last analyzer in the chain.

Set position of the trigger in the trace to the beginning in all analyzers.

One of the analyzers is a clock master to guarantee that all analyzers will share the same time base. All other analyzers are clock slaves.

Configuring and Running Analyzer Software

Figure 3:
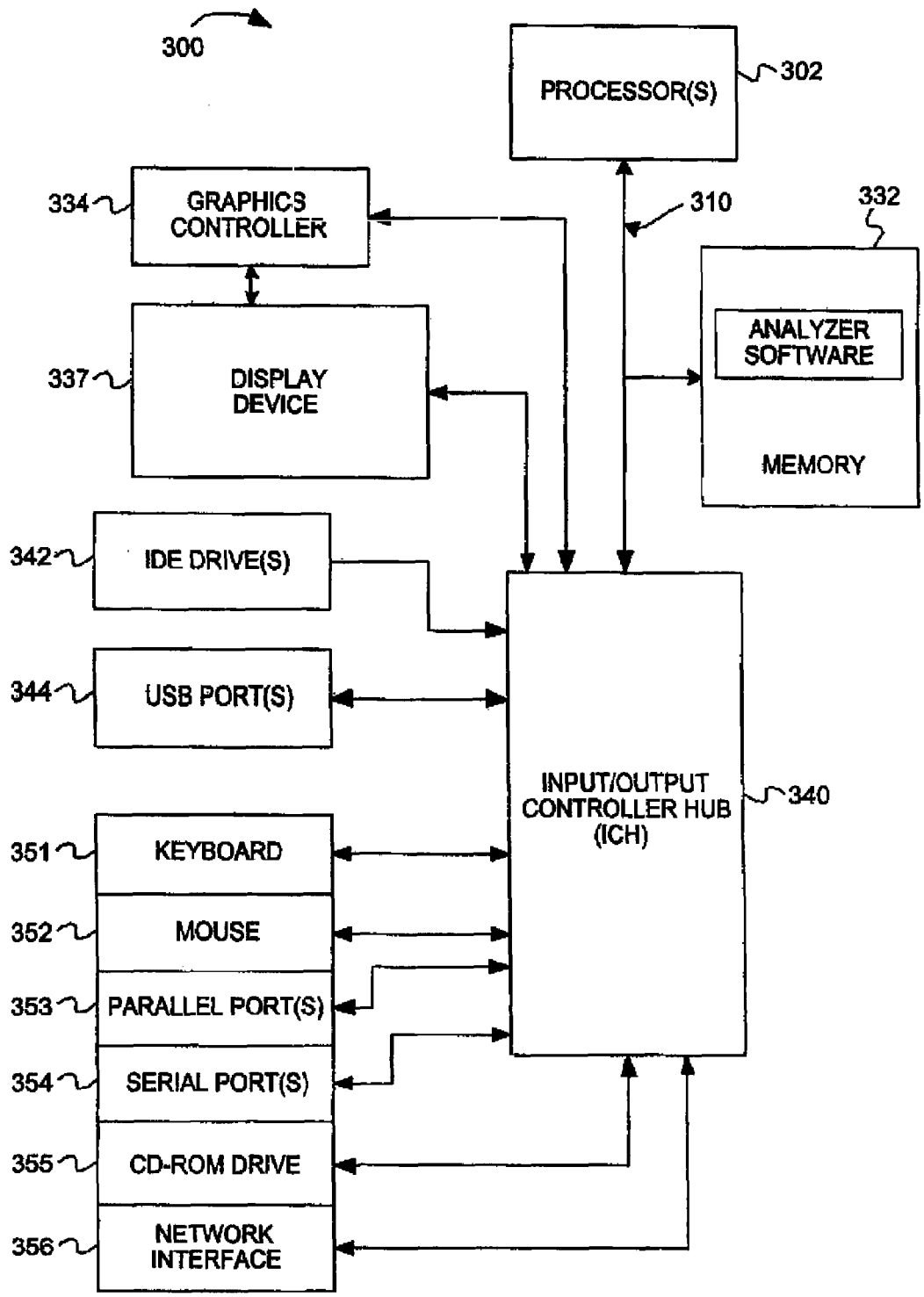
FIG. 3 illustrates an exemplary computer system used in conjunction with certain embodiments of the invention.
Figure 4:
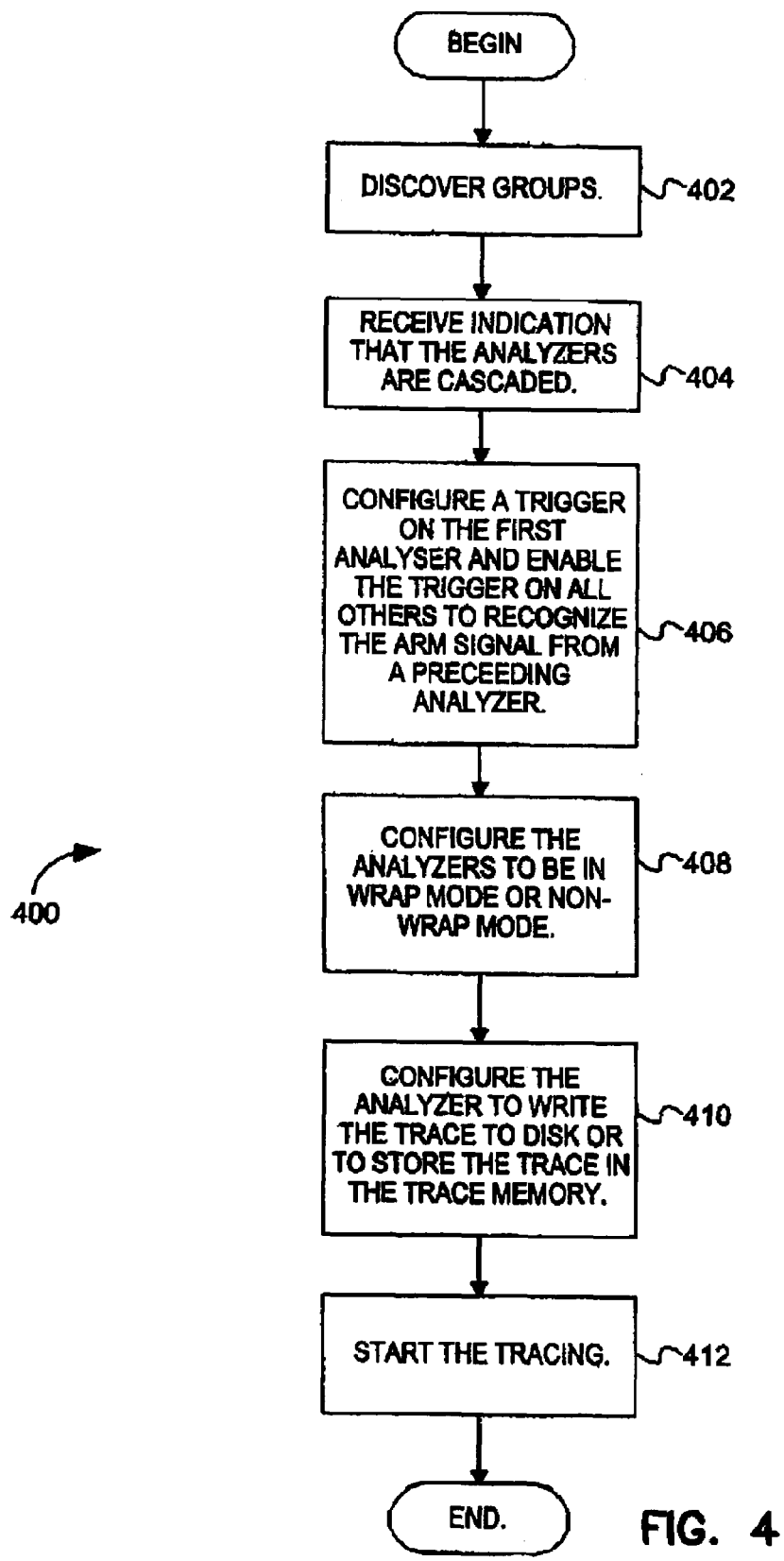
FIG. 4 is a flow diagram illustrating operations for configuring a set of daisy-chained analyzers, according to exemplary embodiments of the invention.
Figure 5:
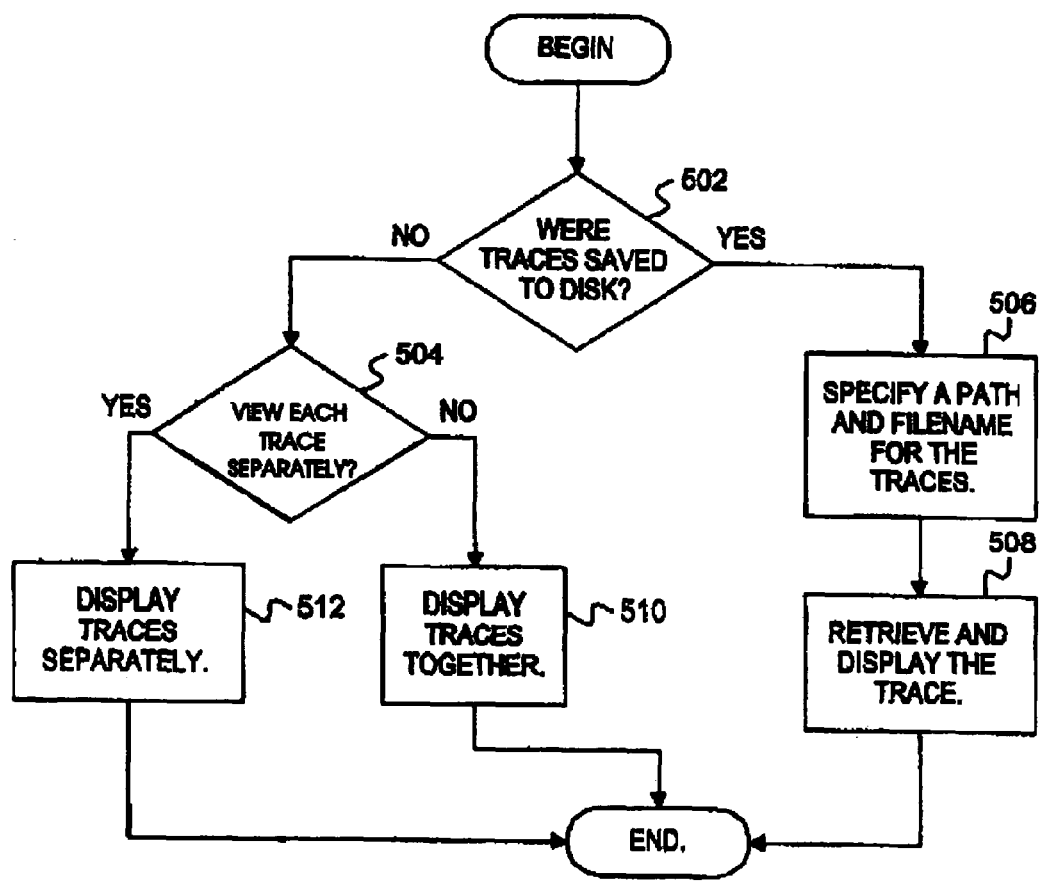
FIG. 5 is a flow diagram illustrating operations for viewing traces, according to exemplary embodiments of the invention.

While FIGS. 1-2 and the discussion above describe connecting and operating analyzers in a daisy-chained configuration, FIGS. 3-5 describe a computer system and software used in conjunction with the daisy-chained analyzers. In particular, FIG. 3 describes a computer system on which the analyzer software can be executed. FIGS. 4 and 5 describe the analyzer software's operations, according to embodiments of the invention.

FIG. 3 illustrates an exemplary computer system used in conjunction with certain embodiments of the invention. As illustrated in FIG. 3, computer system 300 comprises a processor(s) 302. Computer system 300 also includes a memory 332, processor bus 310, and input/output controller hub (ICH) 340. The processor(s) 302 and ICH 140 are coupled to the processor bus 310. The processor(s) 302 may comprise any suitable processor architecture. The computer system 300 may comprise one, two, three, or more processors, any of which may execute a set of instructions in accordance with embodiments of the present invention.

The memory 332, which stores data and/or instructions, may comprise any suitable memory, such as a dynamic random access memory (DRAM), for example. In one embodiment, the memory 332 includes analyzer software for configuring the analyzers, as described below with reference to FIGS. 4 and 5. The computer system 300 also includes IDE drive(s) 342 and/or other suitable storage devices. A graphics controller 334 controls the display of information on a display device 337, according to embodiments of the invention.

The input/output controller hub (ICH) 340 provides an interface to I/O devices or peripheral components for the computer system 300. The ICH 340 may comprise any suitable interface controller to provide for any suitable communication link to the processor(s) 302 and/or to any suitable device or component in communication with the ICH 340. For one embodiment of the invention, the ICH 340 provides suitable arbitration and buffering for each interface.

For one embodiment of the invention, the ICH 340 provides an interface to one or more suitable integrated drive electronics (IDE) drives 342, such as a hard disk drive (HDD) or compact disc read only memory (CD ROM) drive, or to suitable universal serial bus (USB) devices through one or more USB ports 344. For one embodiment, the ICH 340 also provides an interface to a keyboard 351, a mouse 352, a CD-ROM drive 355, one or more suitable devices through one or more parallel ports 353 (e.g., a printer), and one or more suitable devices through one or more serial ports 354. For one embodiment of the invention, the ICH 340 also provides a network interface 356 though which the computer system 300 can communicate with other computers and/or devices.

In one embodiment, the computer system 300 is employed as a host computer 102 (see FIG. 1). In one embodiment, the computer system 300 includes a machine-readable medium that stores a set of instructions (e.g., software) embodying any one, or all, of the methodologies described herein. Further-more, software can reside, completely or at least partially, within memory 332 and/or within the processor(s) 302.

FIG. 4 is a flow diagram illustrating operations for configuring a set of daisy-chained analyzers, according to exemplary embodiments of the invention. The operations of the flow diagram 400 will be described with reference to the computer system and analyzer software of FIG. 3. The flow diagram 400 commences at block 402.

At block 402, groups are discovered. For example, the analyzer software searches for and discovers groups of cascaded analyzers connected to the computer system. In one embodiment, this operation is launched when a user selects a graphical user interface option that instructs analyzer software to search and discover analyzer groups. The process continues at block 404.

At block 404, an indication that the analyzers are cascaded is received. For example, the analyzer software receives an indication that the analyzers are connected in a cascaded fashion. In one embodiment, using a graphical user interface, a user indicates to the analyzer software that the analyzers are cascaded. The process continues at block 406.

As shown at block 406, a trigger on the first analyzer is configured and triggers for other analyzers are enabled to recognize ARM signals from preceding analyzers. For example, the analyzer software configures the trigger on the first analyzer and enables triggers on the other analyzers to recognize the ARM signal from a preceding analyzer. In one embodiment, the trigger position is configured to a 0% position in the trace memory (i.e., the very beginning of the trace memory). In one embodiment, the percent position is a position some percentage from the beginning of the trace memory. For example, 50% trigger position would be in the middle of the trace memory. Alternative embodiments call for different trigger positions. The process continues at block 408.

At block 408, the analyzers are configured to be in wrap mode or non-wrap mode. For example, the analyzer software configures the analyzers to be in wrap mode or non-wrap mode. In one embodiment, using a user interface, a user instructs the analyzer software to configure the analyzers to be in wrap mode or non-wrap mode. As described above, when the analyzers are in wrap mode, then when the trace memory in the last analyzer fills up, the tracing wraps back to the first analyzer and continues recording through many such cycles until a user stops the recording through the analyzer software. In non-wrap mode, the tracing stops when all the trace memories are full. The process continues at block 410.

As shown at block 410, the analyzer is configured to copy the trace from the trace memory to disk after the trace memory fills up. In one embodiment, such copying frees the trace memory for the next recording cycle. In one embodiment, if the user configures the analyzer to write the trace to disk, the user can provide a directory path and filename for storing the trace. In one embodiment, the graphical user interface indicates whether the traces are saved to disk in a status window. The process continues at block 412.

At block 412, the tracing is started. For example, the analyzer software instructs the analyzers to begin tracing (i.e., recording communications between the host computer 102 and the disk array 110 of FIG. 1). In one embodiment, a user instructs (through a graphical user interface) the analyzer software to begin tracing. From block 412, the process ends.

FIG. 5 is a flow diagram illustrating operations for viewing traces, according to exemplary embodiments of the invention. The flow diagram 500 will be described with reference to the exemplary computer system shown in FIG. 3. The flow diagram 500 begins at block 502, where it is determined whether traces were saved to disk. For example, the analyzer software determines whether traces were saved to disk (see block 410 above). If the traces were saved to disk, the process continues at block 506. Otherwise, the process continues at block 504.

At block 504, it is determined whether each trace is to be viewed separately. In one embodiment, the analyzer software receives input from a user (via a graphical user interface) indicating whether the traces will be viewed separately. If the traces will be viewed separately, the process continues at block 512. Otherwise, the process continues at block 510.

As shown at block 512, the traces are displayed separately. For example, the analyzer software separately displays the traces collected by each of the cascaded analyzers. In one embodiment, the analyzer software separately displays the traces in response to a user selecting a "display" button of the graphical user interface. In one embodiment, the segments of traces from individual analyzers are displayed in a set of windows. In one embodiment, the windows can be displayed on the screen as cascaded or tiled horizontally or vertically.

At block 510, the traces are displayed together. For example, the analyzer software displays the traces collected by each of the cascaded analyzers together. In one embodiment, a trace viewer provided by the analyzer software displays the traces stored in all the analyzers as one large trace. For example, in one embodiment, the analyzer software uses the SEAM marks to display the traces as one large trace.

As shown at block 506, a path and filename is specified for the traces. For example, the analyzer software specifies a path and filename for retrieving the traces. The process continues at block 508. In one embodiment, the analyzer software receives the path and filename from a user, through graphical user interface. In one embodiment, the following file naming conventions are used. Unless a full path is specified, the traces will be saved in the root directory on the C: drive of the computer system 300. The filename to use when opening a trace in the graphical user interface is as follows:

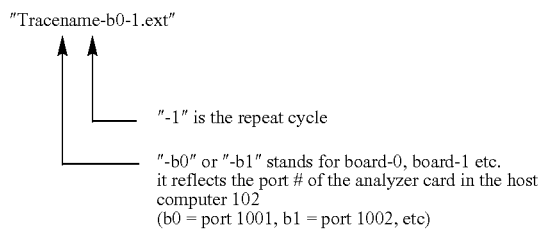

For example, if a long trace is taken using two analyzers cascaded, and these two analyzer cards are installed in the same host computer in two PCI slots as ports 1001 and 1002, the trace is saved under a common a file named "XXX". The following trace files will be saved under file names: XXX-b0-1, XXX-b0-2, and XXX-b0-3, which are the three segments for the first analyzer, and XXX-b1-1, XXX-b1-2, and XXX-b1-3, which are the three segments for the second analyzer. These filenames are used to open the individual traces. In one embodiment, the analyzer software provides a GOTO function and select Bookmarks/Seam on Channel-A (or on Channel-B). These functions allow users to see the trace location where the SEAM is at the end of a trace segment (i.e., where the trace continues in the next analyzer).

In addition to the filenames mentioned above, files with extensions ".A01, A02, A03, etc." and "B01, B02, B03, etc." will be displayed in the same directory. These are the individual 32 MByte parts of each segment for Channel-A and Channel-B respectively. The files "XXX-b0-1.CFA" and "...

.CFB" hold the filenames of the 32 MB parts files in one segment. In one embodiment, both of these files are for administrative use only.

At block 508, the traces are retrieved and displayed. For example, the analyzer software retrieves the traces according to the user specified filename and path. Additionally, the analyzer software displays the traces in a set of one or more windows of the graphical user interface. From block 508, the process ends.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

I claim:

1. A method comprising:
    receiving a packet stream in a master analyzer and a slave analyzer, wherein
        the master analyzer includes a first trace memory, and wherein the slave includes a second trace memory;
    determining whether the first trace memory has been filled past a memory address;
    if the first trace memory has not been filled past the memory address, storing one or more packets of the packet stream in the first trace memory;
    if the first trace memory has been filled past the memory address, performing the following,
        marking a location in the first trace memory;
        transmitting a signal to the slave analyzer; and
        storing one or more packets of the packet stream in the second trace memory.

2. The method of claim 1, wherein the trace memories include a trigger point.

3. The method of claim 1 wherein, if the first trace memory has been filled past the memory address, storing one or more packets of the packet stream in the first trace memory simultaneously with the storing one or more packets of the packet stream in the second trace memory.

4. The method of claim 1, wherein, the master analyzer and the slave analyzer operate based on an independent clock.

5. The method of claim 1, wherein the marking a location in the first trace memory indicates a SEAM.

6. A method comprising:
    receiving a set of one or more frames in a first analyzer, wherein the first analyzer includes a first trace memory;
    receiving the set in a second analyzer, wherein the second analyzer includes a second trace memory, and wherein the second analyzer and the first analyzer are daisy-chained together;
    determining whether the first trace memory has been filled past a memory address; and
    after determining the first trace memory has been filled past a memory address, simultaneously storing frames of the set in the first trace memory and the second trace memory.

7. The method of claim 6 further comprising: after determining the first trace memory has been filled past a memory address, marking a SEAM in the first trace memory.

8. The method of claim 6, wherein the trace memory includes a trigger point.

9. The method of claim 6, wherein the first analyzer and second analyzer use independent clocks.

10. An apparatus comprising:
    a master analyzer including,
        a communication link configured to monitor a packet stream; and
        a trace memory communicatively coupled to the communication link, wherein the trace memory is to store packets of the packet stream until the trace memory has been filled past a memory address, wherein after the trace memory has been filled past a memory address, the master analyzer is to transmit a signal to a slave analyzer, wherein the signal is to trigger the slave analyzer to store packets of the packet stream in a trace memory of the slave analyzer.

11. The apparatus of claim 10, wherein the slave analyzer and the master analyzer are to store packets simultaneously until the trace memory is full.

12. The apparatus of claim 10, wherein the master analyzer and the slave analyzer use a common clock.

13. The apparatus of claim 10, wherein the master analyzer and the slave analyzer use separate clocks.

14. The apparatus of claim 10, wherein the trace memory includes a trigger point.

15. The apparatus of claim 10, wherein after the trace memory has been filled past a memory address, the master analyzer is to store a marker at a memory location in the trace memory.

16. A system comprising:
    a host computer, the host computer to receive network communications;
    a plurality of analyzers communicatively coupled to the host computer, wherein each of the plurality of analyzers includes a plurality of trace memories that form a single virtual memory space, and wherein ones of the plurality of analyzers are to store certain portions of the network communications in the trace memories; and
    a disk array communicatively coupled to one of the plurality of analyzers, wherein the disk array is to store selected contents of the trace memories.

17. The system of claim 16, wherein each of the plurality of trace memories includes a trigger point.

18. The system of claim 16, wherein the plurality of analyzers use a common clock.

* * * * *